United States Patent
Yang et al.

(10) Patent No.: US 10,321,446 B2
(45) Date of Patent: Jun. 11, 2019

(54) METHOD AND DEVICE FOR TRANSMITTING AND RECEIVING CONTROL SIGNAL

(71) Applicant: LG ELECTRONICS INC., Seoul (KR)

(72) Inventors: Suckchel Yang, Anyang-si (KR); Yunjung Yi, Anyang-si (KR); Joonkui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/441,149

(22) PCT Filed: Dec. 6, 2013

(86) PCT No.: PCT/KR2013/011300
§ 371 (c)(1),
(2) Date: May 6, 2015

(87) PCT Pub. No.: WO2014/088371
PCT Pub. Date: Jun. 12, 2014

(65) Prior Publication Data
US 2015/0304996 A1    Oct. 22, 2015

Related U.S. Application Data

(60) Provisional application No. 61/734,382, filed on Dec. 7, 2012.

(51) Int. Cl.
*H04W 72/04* (2009.01)
*H04L 5/00* (2006.01)
(Continued)

(52) U.S. Cl.
CPC ......... *H04W 72/042* (2013.01); *H04L 1/1812* (2013.01); *H04L 5/0053* (2013.01);
(Continued)

(58) Field of Classification Search
None
See application file for complete search history.

(56) References Cited

U.S. PATENT DOCUMENTS

| 2007/0061664 A1* | 3/2007 | Pan ....................... H04L 1/0072 714/748 |
| 2008/0045255 A1* | 2/2008 | Revel .................... H04L 1/1812 455/510 |

(Continued)

FOREIGN PATENT DOCUMENTS

| CN | 102118859 | 7/2011 |
| WO | 2011/068385 | 6/2011 |

(Continued)

OTHER PUBLICATIONS

PCT International Application No. PCT/KR2013/011300, Written Opinion of the International Searching Authority dated Mar. 31, 2014, 19 pages.

(Continued)

*Primary Examiner* — Chirag G Shah
*Assistant Examiner* — Suk Jin Kang
(74) *Attorney, Agent, or Firm* — Lee Hong Degerman Kang Waimey

(57) ABSTRACT

The present invention relates to a method and device for transmitting and receiving a control signal, and the method includes: receiving control information including scheduling information for data transmission and receipt through higher layer signaling; and receiving a trigger signal triggering data scheduling on a terminal using the scheduling information, wherein the trigger signal may be received through a physical channel that carries a hybrid automatic repeat request (HARQ)-acknowledgment (ACK) response for uplink data transmission.

10 Claims, 11 Drawing Sheets

(51) Int. Cl.
  *H04L 1/18* (2006.01)
  *H04L 1/16* (2006.01)
  *H04W 72/12* (2009.01)
(52) U.S. Cl.
  CPC .......... *H04L 5/0055* (2013.01); *H04L 5/0091* (2013.01); *H04L 1/1607* (2013.01); *H04W 72/0453* (2013.01); *H04W 72/1289* (2013.01)

(56) References Cited

U.S. PATENT DOCUMENTS

| | | | | |
|---|---|---|---|---|
| 2009/0228753 | A1* | 9/2009 | Pan | H04L 1/0072 714/748 |
| 2011/0103335 | A1* | 5/2011 | Golitschek Edler von Elbwart | H04L 1/0026 370/329 |
| 2011/0199944 | A1* | 8/2011 | Chen | H04L 5/0007 370/280 |
| 2011/0235558 | A1 | 9/2011 | Diachina et al. | |
| 2012/0120927 | A1* | 5/2012 | Bucknell | H04B 7/022 370/336 |
| 2012/0176887 | A1* | 7/2012 | Mcbeath | H04L 1/1822 370/216 |
| 2012/0213196 | A1* | 8/2012 | Chung | H04B 1/713 370/330 |
| 2012/0257554 | A1* | 10/2012 | Kim | H04L 5/001 370/280 |
| 2012/0257557 | A1* | 10/2012 | Yamazaki | H04W 52/0229 370/311 |
| 2012/0276937 | A1* | 11/2012 | Astely | H04W 72/082 455/501 |
| 2012/0322483 | A1* | 12/2012 | Ji | H04L 5/00 455/509 |
| 2013/0003678 | A1* | 1/2013 | Quan | H04W 72/04 370/329 |
| 2013/0039302 | A1* | 2/2013 | Miki | H04L 5/001 370/329 |
| 2013/0044723 | A1* | 2/2013 | Li | H04L 1/0026 370/329 |
| 2013/0058306 | A1* | 3/2013 | Noh | H04L 1/1671 370/329 |
| 2013/0083753 | A1* | 4/2013 | Lee | H04W 72/0453 370/329 |
| 2013/0107822 | A1* | 5/2013 | Papasakellariou | H04L 5/0053 370/329 |
| 2013/0114570 | A1* | 5/2013 | Park | H04L 5/0053 370/335 |
| 2013/0155878 | A1* | 6/2013 | Deng | H04L 1/1887 370/252 |
| 2013/0176952 | A1* | 7/2013 | Shin | H04L 5/001 370/329 |
| 2013/0178221 | A1* | 7/2013 | Jung | H04L 9/0844 455/450 |
| 2013/0235812 | A1* | 9/2013 | Heo | H04L 5/001 370/329 |
| 2013/0242922 | A1* | 9/2013 | Suzuki | H04L 1/1607 370/329 |
| 2013/0329660 | A1* | 12/2013 | Noh | H04W 72/048 370/329 |
| 2014/0050188 | A1* | 2/2014 | Park | H04L 5/0053 370/329 |
| 2014/0056222 | A1* | 2/2014 | Zhu | H04W 60/00 370/328 |
| 2014/0056237 | A1* | 2/2014 | Eriksson | H04L 1/0006 370/329 |
| 2014/0092789 | A1* | 4/2014 | Lei | H04J 3/1694 370/280 |
| 2014/0153527 | A1* | 6/2014 | Ni | H04L 1/1893 370/329 |
| 2015/0003383 | A1* | 1/2015 | Wager | H04L 1/1812 370/329 |
| 2015/0016390 | A1* | 1/2015 | McBeath | H04L 1/1822 370/329 |
| 2015/0036645 | A1* | 2/2015 | Shin | H04L 5/001 370/329 |
| 2015/0092714 | A1* | 4/2015 | Kanterakis | H04W 74/008 370/329 |
| 2015/0296455 | A1* | 10/2015 | Yamazaki | H04W 72/042 370/311 |
| 2016/0057773 | A1* | 2/2016 | Quan | H04W 72/04 370/329 |
| 2016/0073402 | A1* | 3/2016 | Eriksson | H04L 1/0006 370/336 |
| 2016/0105266 | A1* | 4/2016 | Heo | H04L 5/001 370/329 |
| 2016/0323850 | A1* | 11/2016 | Papasakellariou | H04L 5/0053 |
| 2017/0155495 | A1* | 6/2017 | Che | H04L 5/14 |

FOREIGN PATENT DOCUMENTS

| | | |
|---|---|---|
| WO | 2011/079792 | 7/2011 |
| WO | 2011142640 | 11/2011 |
| WO | 2012/023819 | 2/2012 |
| WO | 2012/136001 | 10/2012 |

OTHER PUBLICATIONS

PCT International Application No. PCT/KR2013/011300, Written Opinion of the International Searching Authority dated Mar. 31, 2014, 13 pages.
European Patent Office Application No. 113861482.1 Search Report dated May 27, 2016, 8 pages.
The State Intellectual Property Office of the People's Republic of China Application Serial No. 201380063630.7, Office Action dated Nov. 3, 2017, 13 pages.

\* cited by examiner

METHOD AND DEVICE FOR TRANSMITTING AND RECEIVING CONTROL SIGNAL

CROSS-REFERENCE TO RELATED APPLICATIONS

This application is the National Stage filing under 35 U.S.C. 371 of International Application No. PCT/KR2013/011300, filed on Dec. 6, 2013, which claims the benefit of U.S. Provisional Application No. 61/734,382, filed on Dec. 7, 2012, the contents of which are all hereby incorporated by reference herein in their entirety.

TECHNICAL FIELD

The present invention relates to a wireless communication system, and more particularly, to a method and apparatus for efficiently transmitting and receiving a control signal.

BACKGROUND ART

Recently, wireless communication systems are widely developed to provide various kinds of communication services including audio communications, data communications and the like. Generally, a wireless communication system is a kind of a multiple access system capable of supporting communications with multiple users by sharing available system resources (e.g., bandwidth, transmission power, etc.). For instance, multiple access systems include CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE

Technical Problem

An object of the present invention devised to solve the problem lies in a method and apparatus for effectively transmitting and receiving a control signal in a wireless communication system.

Another object of the present invention devised to solve the problem lies in a method and apparatus for effectively transmitting and receiving scheduling information for data transmission and receipt.

Another object of the present invention devised to solve the problem lies in a method and apparatus for effectively transmitting and receiving a control signal in machine type communication (MTC).

It is to be understood that both the foregoing general description and the following detailed description of the present invention are exemplary and explanatory and are intended to provide further explanation of the invention as claimed.

Technical Solution

In an aspect of the present invention, provided herein is a method of receiving a control signal by a user equipment (UE), the method comprising receiving control information comprising scheduling information for data communication through a higher layer signaling; and receiving a trigger signal for triggering data scheduling for the UE using the scheduling information, wherein the trigger signal is received through a physical channel for carrying hybrid automatic repeat request (HARQ)-acknowledgement (ACK) response for uplink data transmission.

Preferably, the control information may further comprise resource allocation information for receiving the physical channel.

Preferably, the data scheduling may be triggered when the HARQ-ACK response indicates ACK, and the data scheduling may not be triggered when the HARQ-ACK response indicates negative acknowledgement (NACK).

Preferably, the data scheduling may comprise downlink scheduling or uplink scheduling, and a trigger signal for triggering the downlink scheduling and a trigger signal for triggering the uplink scheduling may be received through the same physical source or different physical resources.

Preferably, the downlink scheduling and the uplink scheduling may be simultaneously triggered when the trigger signals are received through the same physical resource and the HARQ-ACK response indicates ACK.

Preferably, the method may further comprise receiving downlink data or transmitting uplink data using the scheduling information, wherein a resource for HARQ-ACK response for the downlink data or the uplink data may be allocated through a higher layer signaling.

Preferably, the scheduling information may comprise at least one of resource allocation information, modulation and coding scheme information, and transport block size information, for the data communication, and the resource allocation information for receiving the physical channel may comprise at least one of information of a resource group to which the physical channel is allocated, information of an orthogonal sequence applied to the physical channel, and a cycle or offset for monitoring the physical channel.

Preferably, a resource for the physical channel may comprise a plurality of physical resources, and the plurality of physical resources may be frequency division multiplexed (FDM) or code division multiplexed (CDM) in the same subframe or may be time division multiplexed (TDM) across a plurality of subframes.

In another aspect of the present invention, provided herein is a user equipment (UE) for receiving a control signal, the UE comprising: a radio frequency (RF) unit; and a processor, wherein the processor is configured to receive information comprising scheduling information for data communication through a higher layer signaling, through the RF unit, and receive a trigger signal for triggering data scheduling for the UE using the scheduling information, through the RF unit, and wherein the trigger signal is received through a physical channel for carrying hybrid automatic repeat request (HARQ)-acknowledgement (ACK) response for uplink data transmission.

Preferably, the control information further comprises resource allocation information for receiving the physical channel.

Preferably, the data scheduling may be triggered when the HARQ-ACK response indicates ACK, and the data scheduling may not be triggered when the HARQ-ACK response indicates negative acknowledgement (NACK).

Preferably, the data scheduling may comprise downlink scheduling or uplink scheduling, and a trigger signal for triggering the downlink scheduling and a trigger signal for triggering the uplink scheduling may be received through the same physical source or different physical resources.

Preferably, the downlink scheduling and the uplink scheduling may be simultaneously triggered when the trigger signals are received through the same physical resource and the HARQ-ACK response indicates ACK.

Preferably, the processor is further configured to receive downlink data or transmit uplink data using the scheduling information through the RF unit, and wherein a resource for HARQ-ACK response for the downlink data or the uplink data may be allocated through a higher layer signaling.

Preferably, the first information may comprise at least one of resource allocation information, modulation and coding scheme information, and transport block size information, for the data communication, and the second information may comprise at least one of information of a resource group to which the physical channel is allocated, information of an orthogonal sequence applied to the physical channel, and a cycle or offset for monitoring the physical channel.

Advantageous Effects

According to the present invention, a control signal may be effectively transmitted and received in a wireless communication system.

According to the present invention, scheduling information for data transmission and receipt may be effectively transmitted and received.

In addition, according to the present invention, a control signal may be effectively transmitted and received in machine type communication (MTC).

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

DETAILED DESCRIPTION

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). $3^{rd}$ generation partnership project (3GPP) long term evolution (LTE) is a part of E-UMTS (Evolved UMTS), which uses E-UTRA. LTE-Advanced (LTE-A) is an evolved version of 3GPP LTE.

For clarity of explanations, the following description focuses on 3GPP LTE(-A) system. However, technical features of the present invention are not limited thereto. Further, a particular terminology is provided for better understanding of the present invention. However, such a particular terminology may be changed without departing from the technical spirit of the present invention. For example, the present invention may be applied to a system in accordance with a 3GPP LTE/LTE-A system as well as a system in accordance with another 3GPP standard, IEEE 802.xx standard, or 3GPP2 standard.

In a wireless access system, a UE may receive information from a BS in downlink (DL) and transmit information in uplink (UL). The information transmitted or received by the UE may include data and various control information. In addition, there are various physical channels according to the type or use of the information transmitted or received by the UE.

Figure 1:
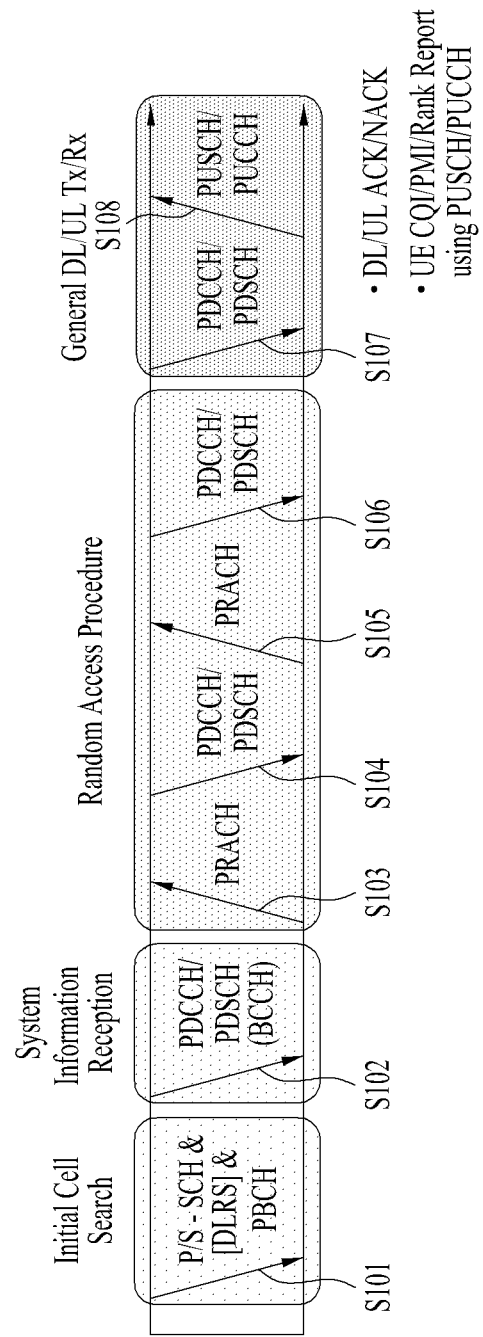
FIG. 1 illustrates physical channels and a general method for transmitting signals on the physical channels in the present invention.

FIG. 1 illustrates physical channels and a general method for transmitting signals on the physical channels in the present invention.

When a UE is powered on or enters a new cell, the UE performs initial cell search in step S101. The initial cell search involves acquisition of synchronization to an eNB. To this end, the UE synchronizes its timing to the eNB and acquires information such as a cell identifier (ID) by receiving a primary synchronization channel (P-SCH) and a secondary synchronization channel (S-SCH) from the eNB. Then the UE may acquire broadcast information in the cell by receiving a physical broadcast channel (PBCH) from the eNB. During the initial cell search, the UE may monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) based on information of the PDCCH in step S102.

To complete access to the eNB, the UE may perform a random access procedure such as steps S103 to S106 with the eNB. To this end, the UE may transmit a preamble on a physical random access channel (PRACH) (S103) and may receive a response message to the preamble on a PDCCH and a PDSCH associated with the PDCCH (S104). In the case of a contention-based random access, the UE may additionally perform a contention resolution procedure including transmission of an additional PRACH (S105) and reception of a PDCCH signal and a PDSCH signal corresponding to the PDCCH signal (S106).

After the above procedure, the UE may receive a PDCCH and/or a PDSCH from the eNB (S107) and transmit a physical uplink shared channel (PUSCH) and/or a physical uplink control channel (PUCCH) to the eNB (S108), in a general UL/DL signal transmission procedure. Information that the UE transmits to the eNB is called Uplink Control Information (UCI). The UCI includes hybrid automatic repeat and request acknowledgement/negative acknowledgement (HARQ-ACK/NACK), scheduling request (SR), channel state information (CSI), etc. The CSI includes channel quality indicator (CQI), precoding matrix indicator (PMI), rank indication (RI), etc. UCI is generally transmitted on a PUCCH periodically. However, if control information and traffic data should be transmitted simultaneously, they may be transmitted on a PUSCH. In addition, the UCI may be transmitted aperiodically on the PUSCH, upon receipt of a request/command from a network.

Figure 2:
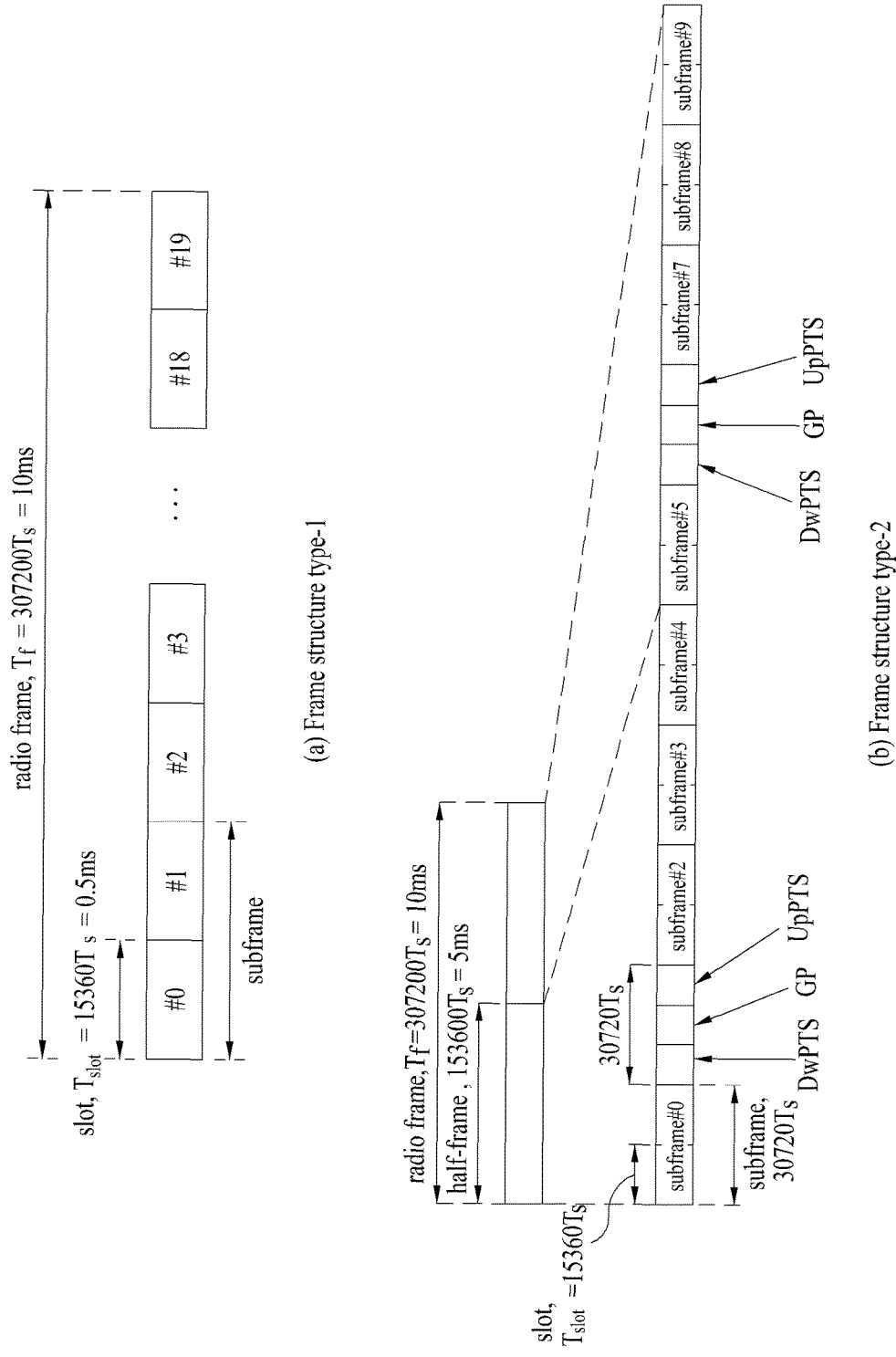
FIG. 2 illustrates a structure of a radio frame used in the present invention.

FIG. 2 illustrates a structure of a radio frame used in the present invention. In a cellular OFDM radio packet communication system, uplink/downlink data packet transmission is performed in subframe units and one subframe is defined as a predetermined duration including a plurality of OFDM symbols. The LTE(-A) standard supports a type-1 radio frame structure applicable to frequency division duplex (FDD) and a type-2 radio frame structure applicable to time division duplex (TDD).

FIG. 2(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the LTE(-A) system, since OFDMA is used in downlink, an OFDM symbol indicates one symbol period. The OFDM symbol may be referred to as an SC-FDMA symbol or symbol period. A RB as a resource assignment unit may include a plurality of consecutive subcarriers in one slot.

The number of OFDM symbols included in one slot may be changed according to the configuration of a cyclic prefix (CP). The CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

In case of using the normal CP, since one slot includes seven OFDM symbols, one subframe includes 14 OFDM symbols. At this time, a maximum of first two or three OFDM symbols of each subframe may be assigned to a physical downlink control channel (PDCCH) and the remaining OFDM symbols may be assigned to a physical downlink shared channel (PDSCH).

FIG. 2(b) shows the structure of the type-2 radio frame. The type-2 radio frame includes two half frames and each half frame includes five subframes, a downlink pilot time slot (DwPTS), a guard period (GP) and an uplink pilot time slot (UpPTS). One subframe includes two slots. For example, a downlink slot (e.g., DwPTS) is used for initial cell search, synchronization or channel estimation of a UE. For example, an uplink slot (e.g., UpPTS) is used for channel estimation of a BS and uplink transmission synchronization of a UE. For example, the uplink slot (e.g., UpPTS) may be used to transmit a sounding reference signal (SRS) for channel estimation in an eNB and to transmit a physical random access channel (PRACH) that carriers a random access preamble for uplink transmission synchronization. The GP is used to eliminate interference generated in uplink due to multi-path delay of a downlink signal between uplink and downlink. Table 1 below shows an uplink (UL)-downlink (DL) configuration in subframes in a radio frame in a TDD mode.

TABLE 1

| Uplink-downlink configuration | Downlink to-Uplink-Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, D represents a DL subframe, U represents a UL subframe, and S represents a special subframe. The special subframe includes a downlink pilot timeslot (DwPTS), a guard period (GP), and an uplink pilot timeslot (UpPTS). Table 2 below shows a special subframe configuration.

TABLE 2

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The above-described radio frame structure is purely exemplary and thus the number of subframes in a radio frame, the number of slots in a subframe, or the number of symbols in a slot may vary in different ways.

Figure 3:
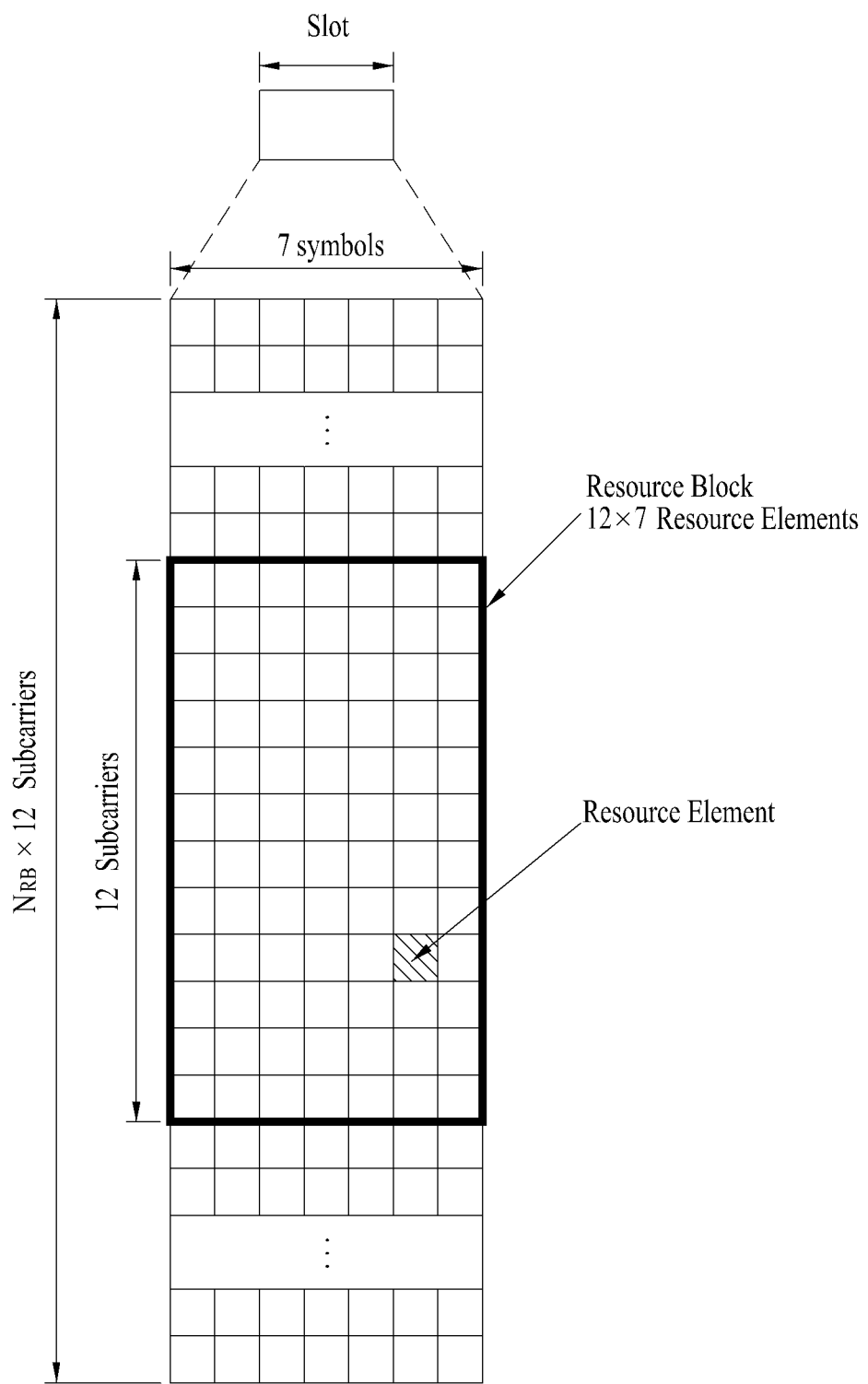
FIG. 3 illustrates a resource grid of one DL slot used in the present invention.

FIG. 3 illustrates a resource grid of one DL slot used in the present invention.

Referring to FIG. 3, a DL slot includes a plurality of OFDM symbols in the time domain. One DL slot may include 7 OFDM symbols and a resource block (RB) may include 12 subcarriers in the frequency domain. However, the present invention is not limited thereto. Each element of the resource grid is referred to as a Resource Element (RE). An RB includes 12×7 REs. The number of RBs in a DL slot, $N^{DL}$ depends on a DL transmission bandwidth. A UL slot may have the same structure as a DL slot.

Figure 4:
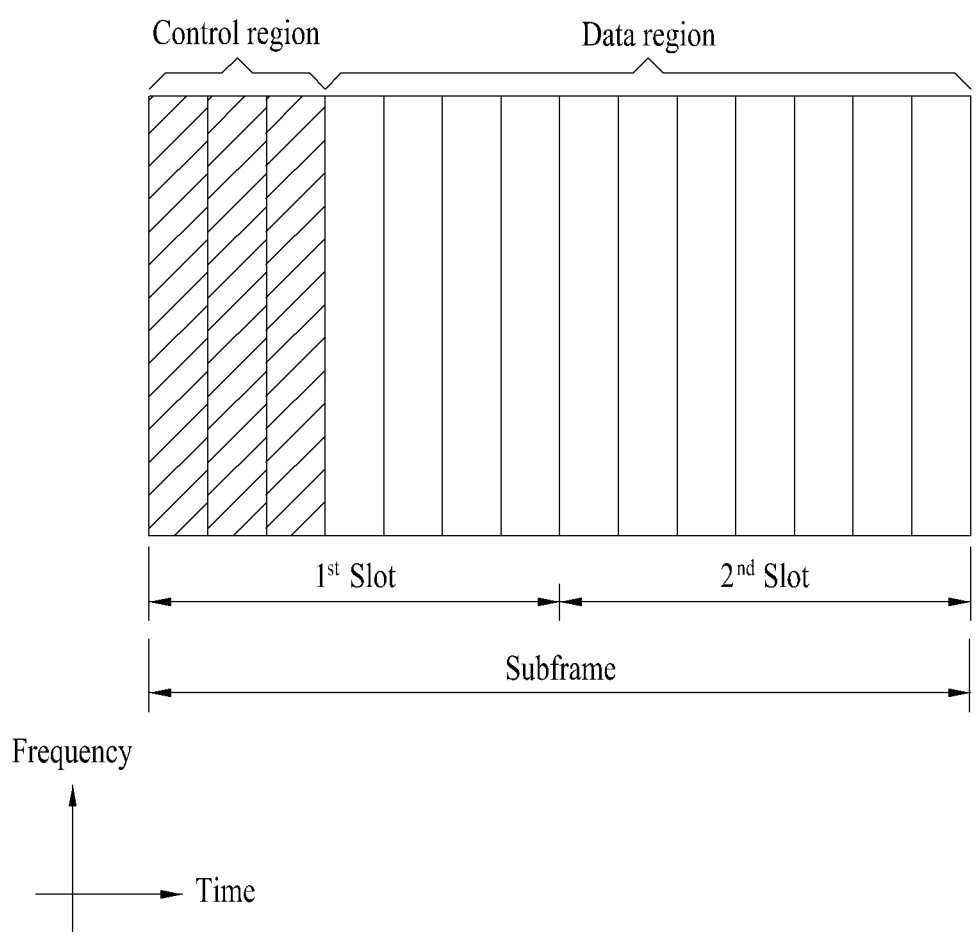
FIG. 4 illustrates a downlink subframe structure used in the present invention.

FIG. 4 illustrates a downlink subframe structure used in the present invention.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is RB. Examples of downlink control channels used in the LTE(-A) system include a physical control format indicator channel (PCFICH), a physical downlink control channel (PDCCH), a physical hybrid ARQ indicator channel (PHICH), etc.

Figure 5:
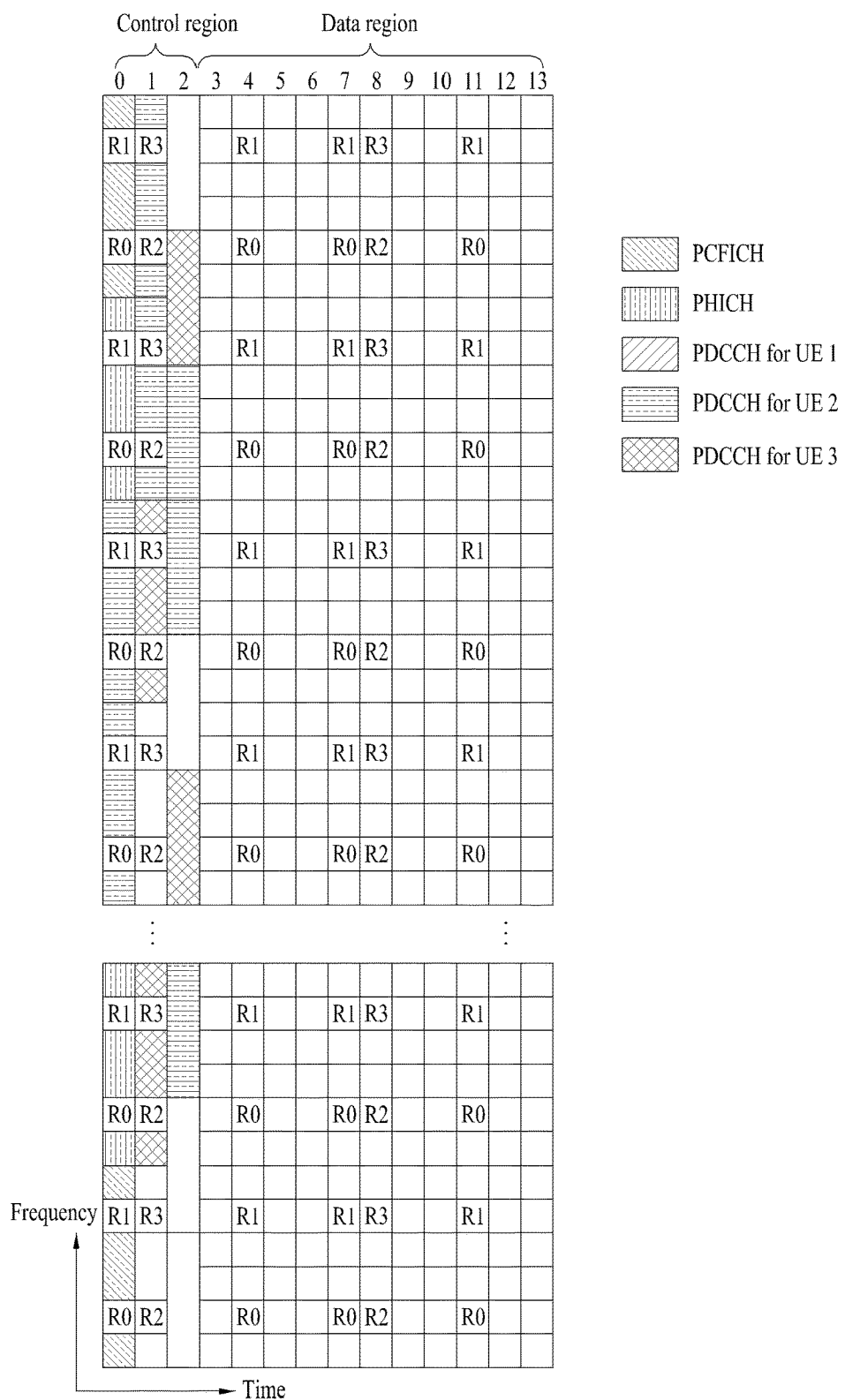
FIG. 5 illustrates a control channel allocated to a downlink subframe.

FIG. 5 illustrates a control channel allocated to a downlink subframe. In FIG. 5, R1 to R4 denote a cell-specific reference signal (CRS) or a cell-common reference signal for antenna ports 0 to 3. The CRS is transmitted in all bands every subframe and fixed in a predetermined pattern in a subframe. The CRS is used to channel measurement and downlink signal demodulation.

Referring to FIG. 5, the PCFICH is transmitted at a first OFDM symbol of a subframe and carries information regarding the number of OFDM symbols used for transmission of control channels within the subframe. The PCFICH is composed of four resource element groups (REGs) that are uniformly distributed in a control region based on a cell ID. One REG may comprise 4 resource elements. The PCFICH indicates a value of 1 to 3 (or 2 to 4) and is modulated via quadrature phase shift keying (QPSK). The PHICH is a response of uplink transmission and carries an HARQ acknowledgment (ACK)/not-acknowledgment (NACK) signal. The PHICH except for CRS and PCFICH (a first OFDM symbol) is allocated on the remaining REGs in one or more OFDM symbols configured by PHICH duration. The PHICH is allocated to three REGs that are distributed if possible on the frequency domain. More detailed description regarding PHICH will be provided below in the present specification.

The PDCCH is allocated in first n OFDM symbols (hereinafter, a control region) of a subframe. Here, n is an integer equal to or greater than 1 and is indicated by the PCFICH. Control information transmitted through the PDCCH is referred to as downlink control information (DCI). DCI format is defined as formats 0, 3, 3A, and 4 for uplink and defined as formats 1, 1A, 1B, 1C, 1D, 2, 2A, 2B, 2C, and 2D for downlink. A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. DCI format optionally includes information about hopping flag, RB allocation, modulation coding scheme (MCS), redundancy version (RV), new data indicator (NDI), transmit power control (TPC), cyclic shift demodulation reference signal (DM-RS), channel quality information (CQI) request, HARQ process number, transmitted precoding matrix indicator (TPMI), precoding matrix indicator (PMI) confirmation, etc. according to its usage.

Table 3 shows an example of control information carried by DCI format 0. In the table, a bit size of each information field is a non-limiting example.

TABLE 3

| Field | Bit(s) |
| --- | --- |
| Flag for determining DCI format 0/1A | 1 |
| Hopping flag | 1 |
| RB assignment | $\lceil \log_2 (N_{RB}^{UL} (N_{RB}^{UL} + 1)/2) \rceil$ |
| MCS (Modulation and coding scheme) and RV (Redundancy Version) | 5 |
| NDI (New Data Indicator) | 1 |
| TPC (Transmit Power Control) command for scheduled PUSCH | 2 |
| Cyclic shift for DM RS | 3 |
| UL index (TDD) | 2 |
| CQI request | 1 |

The flag field is an information flag for discriminating between format 0 and format 1A. That is, DCI format 0 and DCI format 1A have the same payload size and are discriminated from each other by flag fields. The bit size of the resource block allocation and hopping resource allocation field may vary according to hopping PUSCH or non-hopping PUSCH. The resource block allocation and hopping resource allocation field for the non-hopping PUSCH provides $\lceil \log_2(N_{RB}^{UL}(N_{RB}^{UL}+1)/2) \rceil$ bits for resource allocation of the first slot in an uplink subframe. Here, $N_{RB}^{UL}$ denotes the number of RBs included in an uplink slot and depends upon an uplink transmission bandwidth set in a cell. Accordingly, the payload size of DCI format 0 can depend upon uplink bandwidth. DCI format 1A includes an information field for PDSCH allocation. The payload size of DCI format 1A can depend upon downlink bandwidth. DCI format 1A provides a reference information bit size for DCI format 0. Accordingly, DCI format 0 is padded with '0' until the payload size of DCI format 0 becomes identical to the payload size of DCI format 1A when the number of information bits of DCI format 0 is less than the number of information bits of DCI format 1A. The added '0' is filled in a padding field of DCI format.

A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Each PDCCH is transmitted using one or more control channel elements (CCEs) and each CCE corresponds to nine sets of four resource elements. The four resource elements are referred to as a resource element group (REG). Four QPSK symbols are mapped to one REG. A resource element allocated to a reference signal is not included in an REG and thus a total number of REGs in a given OFDM symbol varies according to whether a cell-specific reference signal is present.

Table 4 shows the number of CCEs, the number of REGs, and the number of PDCCH bits according to PDCCH format.

TABLE 4

| PDCCH format | Number of CCE (n) | Number of REG | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

The LTE(-A) system defines a limited set of CCE positions in which a PDCCH is to be positioned for each UE. A limited set of CCE positions that a UE can find a PDCCH of the UE may be referred to as a search space (SS). In the LTE(-A) system, the SS has different sizes according to each PDCCH format. In addition, a UE-specific SS and a common SS are separately defined. The BS does not provide the UE with information indicating where the PDCCH is located in the control region. Accordingly, the UE monitors a set of PDCCH candidates within the subframe and finds its own PDCCH. The term "monitoring" means that the UE attempts to decode the received PDCCHs according to respective DCI formats. The monitoring for a PDCCH in an SS is referred to as blind decoding (blind detection). Through blind decoding, the UE simultaneously performs identification of the PDCCH transmitted to the UE and decoding of the control information transmitted through the corresponding PDCCH. For example, in the case where the PDCCH is de-masked using the C-RNTI, the UE detects its own PDCCH if a CRC error is not detected. The USS is separately configured for each UE and a scope of CSSs is known to all UEs. The USS and the CSS may be overlapped with each other. When a significantly small SS is present, if some CCE positions are allocated in an SS for a specific UE, the remaining CCEs are not present. Thus a BS may not find CCE resources in which the PDCCH is to be transmitted to all available UEs in a given subframe. In order to minimize the possibility that such blocking is subsequent to a next subframe, a start position of the USS is UE-specifically hopped.

Table 5 shows sizes of CSS and USS.

TABLE 5

| PDCCH format | Number of CCE (n) | Number of candidates in CSS | Number of candidates in USS |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the UE-specific search space. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the UE-common search space. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. A PDSCH transmission scheme and information contents of DCI formats according to a transmission mode will be listed below.

Transmission Mode (TM)
Transmission Mode 1: Transmission from a single eNB antenna port
Transmission Mode 2: Transmit diversity
Transmission Mode 3: Open-loop spatial multiplexing
Transmission Mode 4: Closed-loop spatial multiplexing
Transmission Mode 5: Multi-user MIMO
Transmission Mode 6: Closed-loop rank-1 precoding
Transmission Mode 7: Single-antenna port (port 5) transmission
Transmission Mode 8: Dual layer transmission (ports 7 and 8) or single-antenna port (port 7 or 8) transmission
Transmission Modes 9 and 10: Layer transmission up to rank 8 (ports 7 to 14) or single-antenna port (port 7 or 8) transmission DCI Format
Format 0: Resource grant for PUSCH transmission (uplink)
Format 1: Resource allocation for single codeword PUSCH transmission (transmission modes 1, 2, and 7)
Format 1A: Compact signaling of resource allocation for single codeword PDSCH transmission (all modes)
Format 1B: Compact resource allocation for PDSCH (mode 6) using rank-1 closed-loop precoding
Format 1C: Very compact resource allocation for PDSCH (e.g., paging/broadcast system information)
Format 1D: Compact resource allocation for PDSCH (mode 5) using multi-user MIMO
Format 2: Resource allocation for PDSCH (mode 4) of closed-loop MIMO operation
Format 2A: Resource allocation for PDSCH (mode 3) of open-loop MIMO operation
Format 3/3A: Power control command with 2-bit/1-bit power adjustments for PUCCH and PUSCH
Format 4: Resource grant for PUSCH transmission (uplink) in a cell configured in a multi-antenna port transmission mode A UE may be semi-statically configured via higher layer signaling for reception of PDSCH data transmission that is scheduled through the PDCCH according to ten transmission modes. Table 5 below shows a transmission mode signaled via a higher layer and configurable DCI format when a UE detects a scrambled PDCCH as a C-RNTI identifier.

Figure 6:
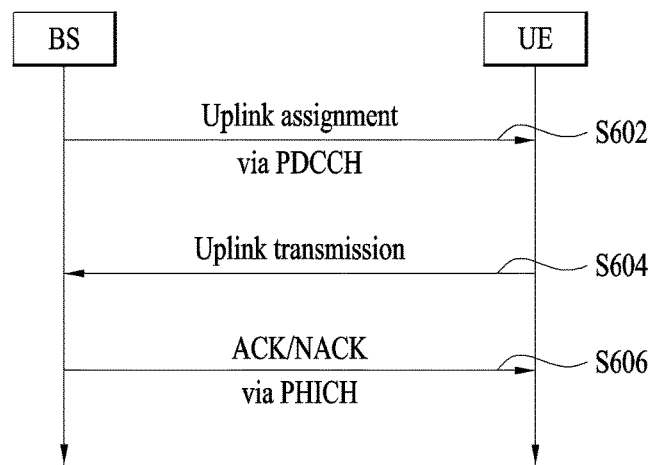
FIG. 6 is an example of a method of transmitting ACK/NACK signal for uplink data.

FIG. 6 is an example of a method of transmitting ACK/NACK signal for uplink data. Referring to FIG. 6, a network node (e.g., a base station) transmits UL allocation information to a user equipment via PDCCH [S602]. Control information for UL allocation can be called a UL grant and includes resource block allocation information for PUSCH transmission, cyclic shift information for DMRS (data demodulation reference signal) and the like. Then, the user equipment transmits UL data (e.g., PUSCH) to the base station in accordance with the UL allocation information [S604]. The base station receives the UL data from the user equipment and then transmits a reception response signal (ACK/NACK) for the UL data to the user equipment via PHICH [S606].

A plurality of PHICHs may be mapped to the same resource element group (e.g., REG) and construct a PHICH group. Each of the PHICHs within the same PHICH group may be distinguished by an orthogonal sequence. A PHICH resource may be identified by an index pair ($n_{PHICH}^{group}$, $n_{PHICH}^{seq}$). In this case, $n_{PHICH}^{group}$ indicates the PHICH group number and $n_{PHICH}^{seq}$ indicates an orthogonal sequence index within the PHICH group. $n_{PHICH}^{group}$ and $n_{PHICH}^{seq}$ may be confirmed using a lowest PRB index among PRB (Physical Resource Block) indexes allocated for the PUSCH transmission and a cyclic shift of DMRS transmitted as UL grant. Formula 1 shows an example of finding $n_{PHICH}^{group}$ and $n_{PHICH}^{seq}$.

$$n_{PHICH}^{group}=(I_{PRB\_RA}+n_{DMRS}) \bmod N_{PHICH}^{group}+I_{PHICH}N_{PHICH}^{group}$$

$$n_{PHICH}^{seq}=(\lfloor I_{PRB\_RA}/N_{PHICH}^{group} \rfloor + n_{DMRS}) \bmod 2N_{SF}^{PHICH} \quad \text{[Formula 1]}$$

In Formula 1, $n_{DMRS}$ is mapped from a cyclic shift value for DMRS. $N_{SF}^{PHICH}$ indicates a spreading factor size used for PHICH. $I_{PRB\_RA}$ may be determined as $I_{PRB\_RA}^{lowest\ index}$ for the first transport block of a PUSCH, and may be determined as $I_{PRB\_RA}^{lowest\ index}+1$ for the second transport block of the PUSCH. $I_{PRB\_RA}^{lowest\ index}$ indicates a lowest PRB index for PUSCH transmission. $N_{PHICH}^{group}$ indicates the number of PHICH groups. $I_{PHICH}$ has a value of 0 or 1 according to a frame type or subframe type.

Table 6 exemplarily shows a mapping between $n_{DMRS}$ and a cyclic shift value in a DMRS field.

TABLE 6

| Cyclic Shift for DMRS Field in PDCCH with uplink DCI format in [4] | $n_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

In case of FDD frame (frame structure type 1), the number $N_{PHICH}^{group}$ of PHICH groups is constant for all subframes. And, the number of the PHICH groups in one subframe is given by Formula 2.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{[Formula 2]}$$

In Formula 2, $N_g \in \{1/6, 1/2, 1, 2\}$ is provided by an upper layer and the $N_{RB}^{DL}$ indicates the number of resource blocks (RBs) on a DL band.

In case of TDD frame (frame structure type 2), the number of PHICH groups may vary for each DL subframe and may be given as $m_i \cdot N_{PHICH}^{group}$. Table 7 represents $m_i$.

TABLE 7

| Uplink-downlink configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | — | — | — | 2 | 1 | — | — | — |
| 1 | 0 | 1 | — | — | 1 | 0 | 1 | — | — | 1 |
| 2 | 0 | 0 | — | 1 | 0 | 0 | 0 | — | 1 | 0 |
| 3 | 1 | 0 | — | — | — | 0 | 0 | 0 | 1 | 1 |
| 4 | 0 | 0 | — | — | 0 | 0 | 0 | 0 | 1 | 1 |
| 5 | 0 | 0 | — | 0 | 0 | 0 | 0 | 0 | 1 | 0 |
| 6 | 1 | 1 | — | — | — | 1 | 1 | — | — | 1 |

Figure 7:
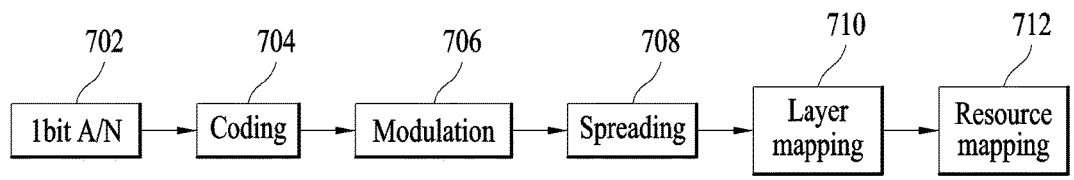
FIG. 7 illustrates an example of a PHICH signal processing process/block.

FIG. 7 illustrates an example of a PHICH signal processing process/block. Referring to FIG. 7, a PHICH processing procedure includes ACH/NACK (A/N) generation 702, (channel) coding 704, modulation 706, spreading 708, layer mapping 710 and resource element mapping 712.

The ACK/NACK generating block 702 generates 1-bit ACK/NACK in accordance with a decoding result of PUSCH (corresponding to data stream, codeword or transport block) received from a user equipment. Since the LTE system does not employ SU-MIMO (single user multiple input multiple output) in UL, 1-bit ACK/NACK for PUSCH transmission of one user equipment, i.e., a single data stream is transmitted via PHICH. In the following description, 1-bit ACK/NACK outputted from the ACK/NACK generating block 702 is referred to as HARQ indicator (HI).

Figure 8:
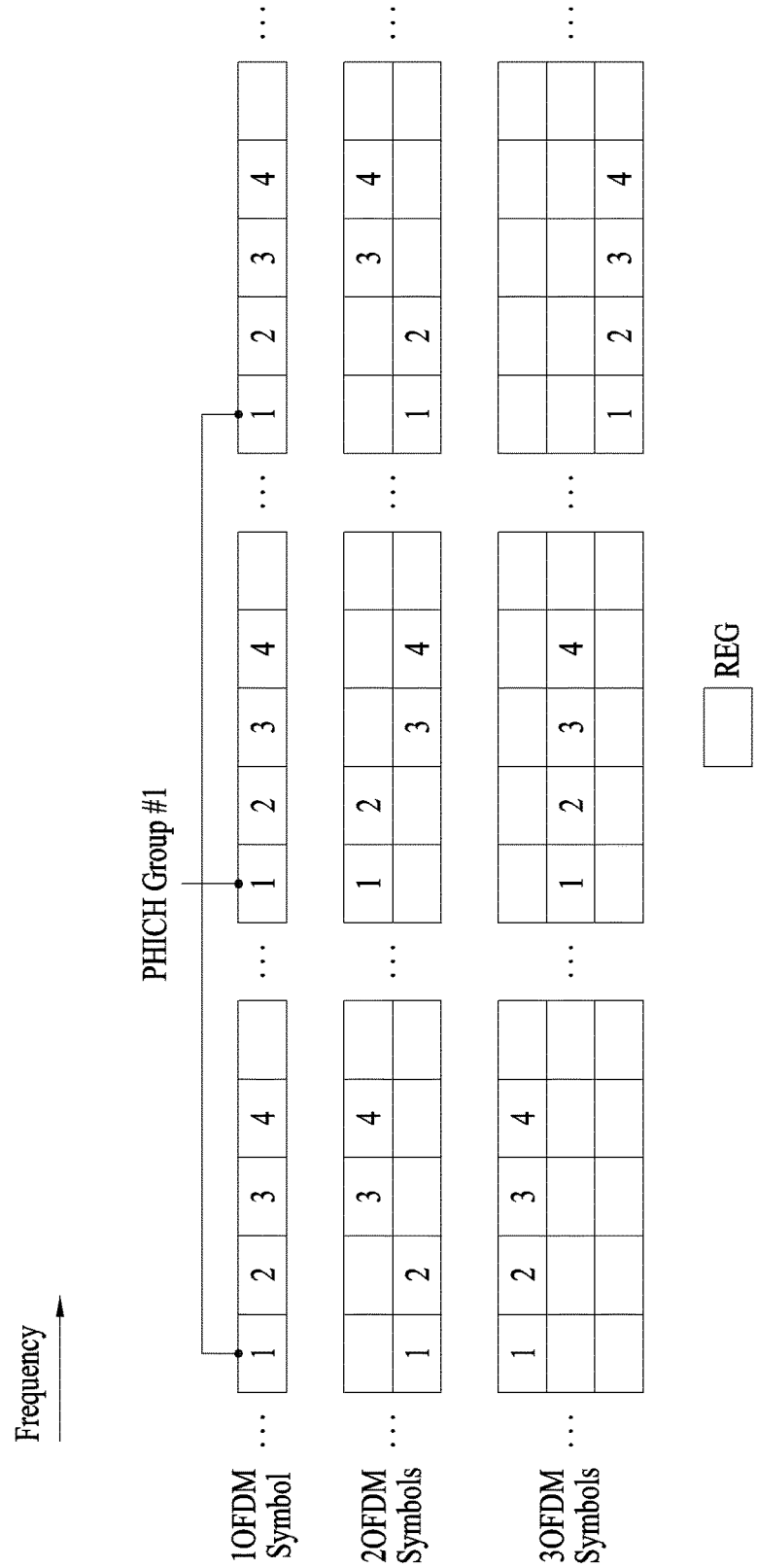
FIG. 8 illustrates an example of allocating PHICH within a control region.

FIG. 8 illustrates an example of allocating PHICH within a control region. PHICH is mapped to a REG other than PCFICH and RS within OFDMA symbol.

Referring to FIG. 8, a PHICH group is transmitted using 3 REGs spaced apart from each other as far as possible in a frequency domain. As a result, each bit of a HI codeword is carried on each REG. PHICH groups are contiguously allocated in the frequency domain. The same numeral in the drawing indicates a REG belonging to the same PHICH group. The PHICH duration is limited by a size of the control region, and the PHICH duration corresponds to 1 to 3 OFDMA symbols. In case that a plurality of OFDMA symbols are used for PHICH transmission, REGs belonging to the same PHICH group for transmission diversity are transmitted using different OFDMA symbols.

Figure 9:
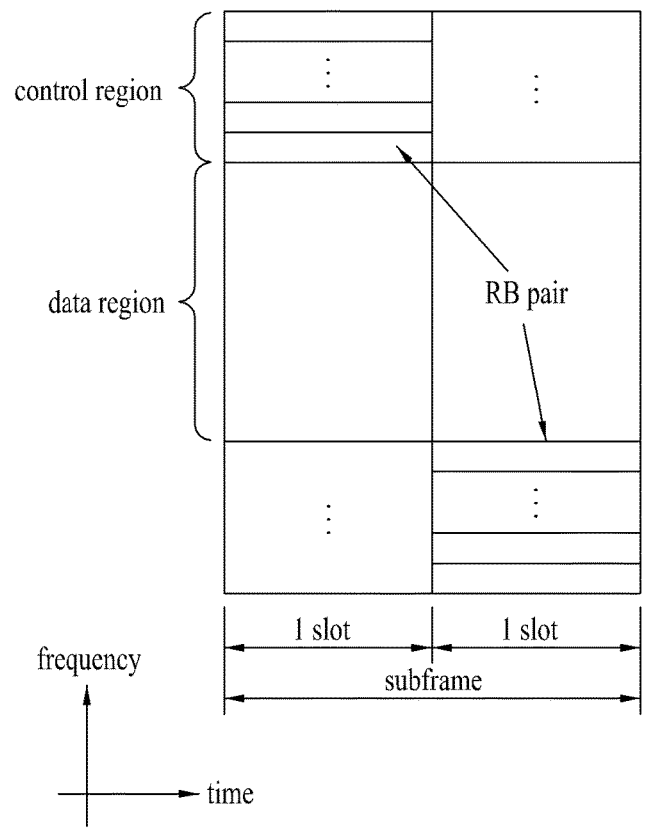
FIG. 9 illustrates an exemplary structure of an uplink subframe that may be used in LTE(-A) system.

FIG. 9 illustrates an exemplary structure of an uplink subframe that may be used in LTE(-A) system.

Referring to FIG. 9, the uplink subframe includes a plurality of slots (for example, two). Each slot may include a plurality of SC-FDMA symbols, wherein the number of SC-FDMA symbols included in each slot is varied depending on a cyclic prefix (CP) length. In an example, a slot may comprise 7 SC-FDMA symbols in case of normal CP. An uplink subframe is divided into a data region and a control region in a frequency domain. The data region includes a PUSCH, and is used to transmit a data signal that includes voice information. The control region includes a PUCCH, and is used to transmit uplink control information (UCI). The PUCCH includes RB pair (e.g. m=0,1,2,3) located at both ends of the data region on a frequency axis, and performs hopping on the border of the slots.

The PUCCH may be used to transmit the following control information.

SR (Scheduling Request): information used to request uplink UL-SCH resource. The SR is transmitted using an on-off keying (OOK) scheme.

HARQ ACK/NACK: a response signal to the PDCCH indicating semi-persistent scheduling (SPS) release and a downlink data packet on the PDSCH. HARQ ACK/NACK represents whether the PDCCH indicating SPS release or the downlink data packet has been successfully received. ACK/NACK 1 bit is transmitted in response to a single downlink codeword (CW), and ACK/NACK 2 bits are transmitted in response to two downlink codewords.

CQI (Channel Quality Indicator): feedback information on a downlink channel. MIMO (Multiple Input Multiple Output) related feedback information includes a rank indicator (RI) and a precoding matrix indicator (PMI). 20 bits per subframe are used.

Table 8 illustrates a mapping relation between the PUCCH format and the UCI that may be used in the present invention.

TABLE 8

| PUCCH format | Uplink Control Information, UCI |
|---|---|
| Format 1 | SR(Scheduling Request) (un-modulated waveform) |
| Format 1a | 1-bit HARQ ACK/NACK (with/without SR) |
| Format 1b | 2-bit HARQ ACK/NACK (with/without SR) |
| Format 2 | CSI (20 coded bits) |
| Format 2 | CSI and 1/2-bit HARQ ACK/NACK (20 bits) (Extended CP only) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | HARQ ACK/NACK + SR (48 bits) |

Figure 10:
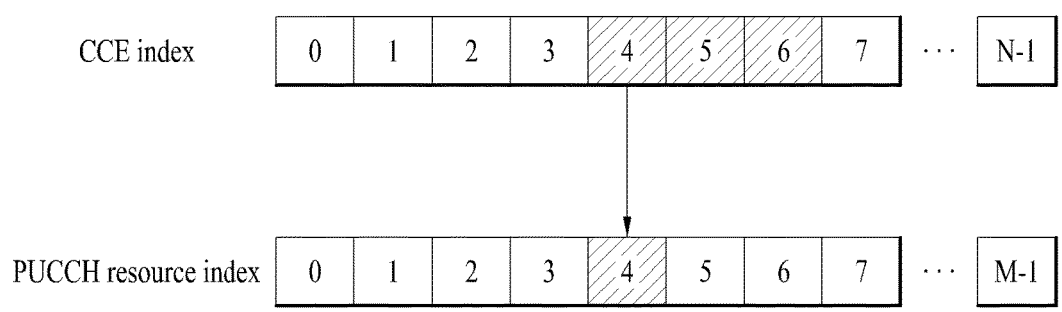
FIG. 10 shows an example of determining PUCCH resources for ACK/NACK.

FIG. 10 shows an example of determining PUCCH resources for ACK/NACK. A PUCCH resource for ACK/NACK information is not allocated to each UE in a cell in advance in LTE system, and a plurality of UEs in a cell share a plurality of PUCCH resources each time. Specifically, a PUCCH resource that a UE uses to transmit the ACK/NACK may correspond to a PDCCH that carries scheduling information regarding corresponding downlink data. In detail, one or more control channel elements (CCEs) construct a PDCCH transmitted to a UE in a downlink subframe, and ACK/NACK may be transmitted through a PUCCH resource corresponding to a specific CCE (e.g., the first CCE) among the CCEs constructing the corresponding PDCCH.

Referring to FIG. 10, each square in a DL Component Carrier (CC) represents a CCE and each square of a UL CC represents a PUCCH resource. Each PUCCH index indicates a PUCCH resource for an ACK/NACK. If information about a PDSCH is delivered on a PDCCH comprising CCEs 4, 5, and 6 as illustrated in FIG. 10, the UE transmits an ACK/NACK using PUCCH 4 corresponding to CCE 4 which is the most preceding of the CCEs constructing the PDCCH. FIG. 10 illustrates an exemplary case in which there are up to M PUCCHs in a UL CC, for a DL CC having up to N CCEs. While N may be equal to M, N and M may be different and thus the CCEs may be mapped to the PUCCHs in an overlapped manner.

Specifically, a PUCCH resource index is determined by the following equation in LTE system.

$$n_{PUCCH}^{(1)} = n_{CCE} + N_{PUCCH}^{(1)} \qquad \text{[Formula 3]}$$

Here, $n^{(1)}_{PUCCH}$ is a resource index for PUCCH format 1 used for transmission of ACK/NACK/DTX, $N^{(1)}_{PUCCH}$ is a value signaled via higher-layer signaling, and $n_{CCE}$ is the lowest index of CCE indexes used for PDCCH transmission. A cyclic shift, an orthogonal cover code (or an orthogonal spreading code), and a physical resource block (PRB) for PUCCH format 1 are acquired from $n^{(1)}_{PUCCH}$.

Figure 11:
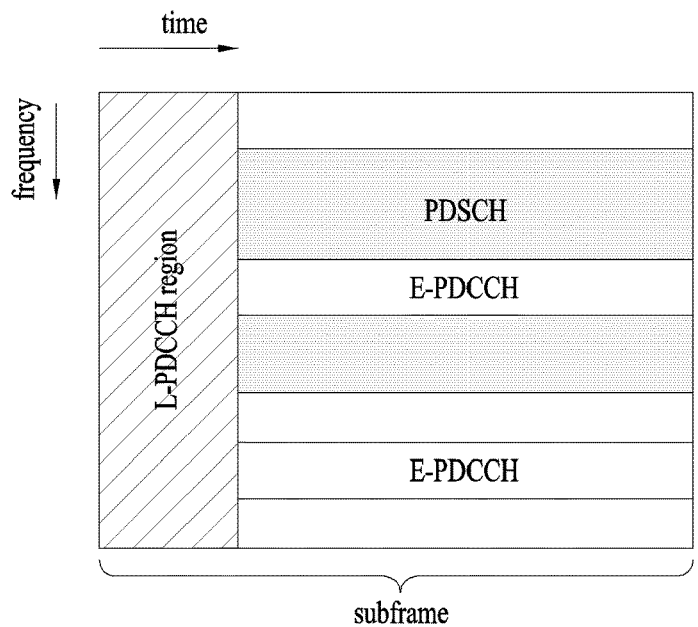
FIG. 11 illustrates an example of allocating a DL physical channel in a subframe.

FIG. 11 illustrates an example of allocating a DL physical channel in a subframe.

Referring to FIG. 11, a PDCCH (for convenience, legacy PDCCH or L-PDCCH) used in the LTE(-A) system may be allocated to a control region of a subframe. In the drawing, an L-PDCCH region refers to a region to which the legacy PDCCH is allocated. In the context, the L-PDCCH region may refer to a control region, a control channel resource region (i.e., a CCE resource) to which a PDCCH can be actually allocated, or a PDCCH search space. A PDCCH may be additionally allocated in a data region (e.g., a resource region for a PDSCH, refer to FIG. 5). The PDCCH allocated to the data region is referred to as an E-PDCCH. As illustrated, a channel resource may be additionally ensured through the E-PDCCH to alleviate scheduling restrictions due to limited control channel resource of an L-PDCCH region.

In detail, the E-PDCCH may be detected/demodulated based on a DM-RS. The E-PDCCH may be configured to be transmitted over a PRB pair on a time axis. In more detail, a search space (SS) for E-PDCCH detection may be configured with one or more (e.g., 2) E-PDCCH candidate sets. Each E-PDCCH set may occupy a plurality of (e.g., 2, 4, or 8) PRB pairs. An enhanced-CCE (E-CCE) constructing an E-PDCCH set may be mapped in the localized or distributed form (according to whether one E-CCE is distributed in a plurality of PRB pairs). In addition, when E-PDCCH based scheduling is configured, a subframe for transmission/detection of an E-PDCCH may be designated. The E-PDCCH may be configured in only a USS. The UE may attempt DCI detection only on an L-PDCCH CSS and an E-PDCCH USS in a subframe (hereinafter, an E-PDCCH subframe) in which E-PDCCH transmission/detection is configured and attempt DCI detection on an L-PDCCH CSS and an L-PDCCH USS in a subframe (non-E-PDCCH subframe) in which transmission/detection of E-PDCCH is not configured.

In the case of the E-PDCCH, in terms of one UE, a USS may include K E-PDCCH set(s) (for each CC/for each cell). K may be greater than or equal to 1 and equal to or smaller than a specific upper limit (e.g., 2). In addition, each E-PDCCH set (within a PDSCH region) may comprise N PRBs. Here, N and PRB resource/index configured with the N PRBs may be independently (i.e., set-specifically) allocated for each respective E-PDCCH set. Accordingly, the number and index of E-CCE resources configured with each E-PDCCH set may be configured (UE-specially and) set-specifically. A PUCCH resource/index linked to each E-CCE resource/index may also be allocated (UE-specifically and) set-specifically by independently configuration a start PUCCH resource/index for each respective E-PDCCH set. Here, the E-CCE may refer to a basic control channel unit of an E-PDCCH including a plurality of REs (within a PRB in a PDSCH region). The E-CCE may have different structures according to an E-PDCCH transmission form. For example, an E-CCE for localized transmission may be configured using an RE belonging in the same PRB pair. On the other hand, an E-CCE for distributed transmission may be configured with an RE extracted from a plurality of PRB pairs. In the case of the localized E-CCE, in order to perform optimum beamforming on each user, an antenna port (AP) may be independently used for each respective E-CCE resource/index. On the other hand, in the case of distributed E-CCE, the same antenna port set may be repeatedly used in different E-CCEs such that a plurality of users may commonly use antenna ports. The E-CCE may be referred to as an eCCE.

Like an L-PDCCH, an E-PDCCH carries DCI. For example, the E-PDCCH may carry DL scheduling information and UL scheduling information. An E-PDCCH/PDSCH procedure and an E-PDCCH/PUSCH procedure are the same/similar to in steps S107 and S108 of FIG. 1. That is, a UE may receive the E-PDCCH and receive data/control information through a PDSCH corresponding to the E-PDCCH. In addition, the UE may receive the E-PDCCH and transmit data/control information through a PUSCH corresponding to the E-PDCCH. The LTE(-A) system pre-reserves a PDCCH candidate region (hereinafter, a PDCCH search space) in a control region and transmits a PDCCH of a specific UE to a partial region of the PDCCH candidate region. Accordingly, the UE may acquire a PDCCH of the UE in the PDCCH search space via blind decoding. Similarly, the E-PDCCH may be transmitted over a partial or entire portion of a pre-reserved resource.

Figure 12:
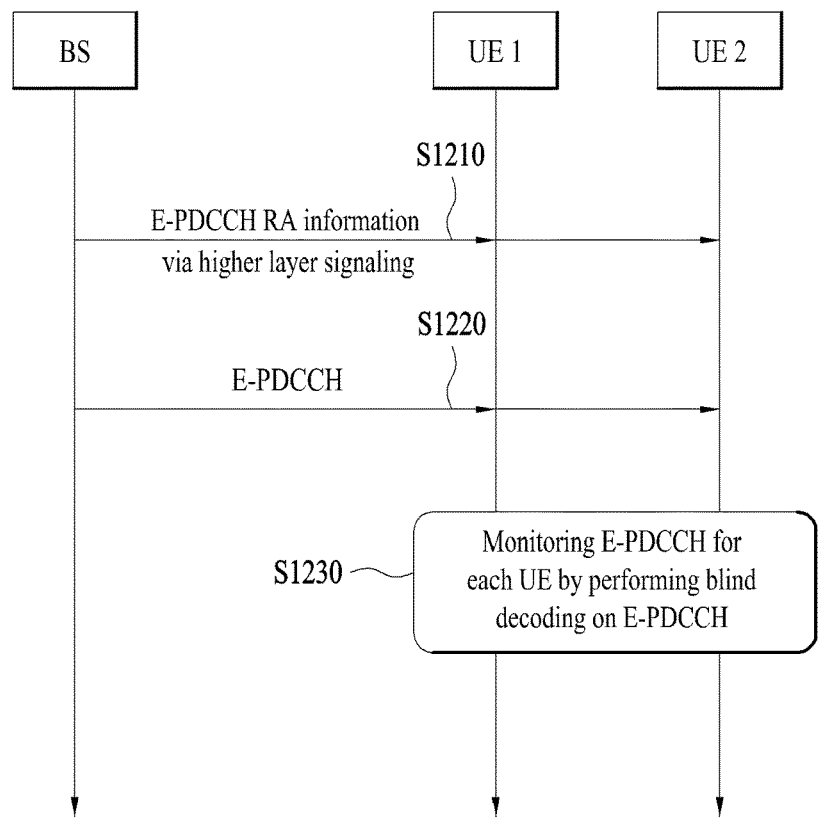
FIG. 12 illustrates resource allocation for an E-PDCCH and an E-PDCCH receiving procedure.

FIG. 12 illustrates resource allocation for an E-PDCCH and an E-PDCCH receiving procedure.

Referring to FIG. 12, a BS transmits E-PDCCH resource allocation (RA) information to a UE (S1210). The E-PDCCH RA information may include RB (or virtual resource block (VRB)) allocation information. The RB allocation information may be given in units of RB or resource block group (RBG). The RBG includes two or more consecutive RBs. The E-PDCCH RA information may be transmitted using higher layer (e.g., radio resource control layer and RRC layer) signaling. Here, The E-PDCCH RA information may be used to pre-reserve an E-PDCCH resource (region). Then the BS transmits an E-PDCCH to the UE (S1220). The E-PDCCH may be transmitted in a partial region or an entire region of the E-PDCCH resource (e.g., M RBs) that is reserved in step S1210. Accordingly, the UE may monitor a resource (region) (hereinafter, E-PDCCH search space) in which an E-PDCCH can be transmitted (S1230). The E-PDCCH search space may be given as a portion of the RB set allocated in step S1210. Here, the monitoring includes blind decoding or blind detection of a plurality of E-PDCCH candidates in the E-PDCCH search space.

Figure 13:
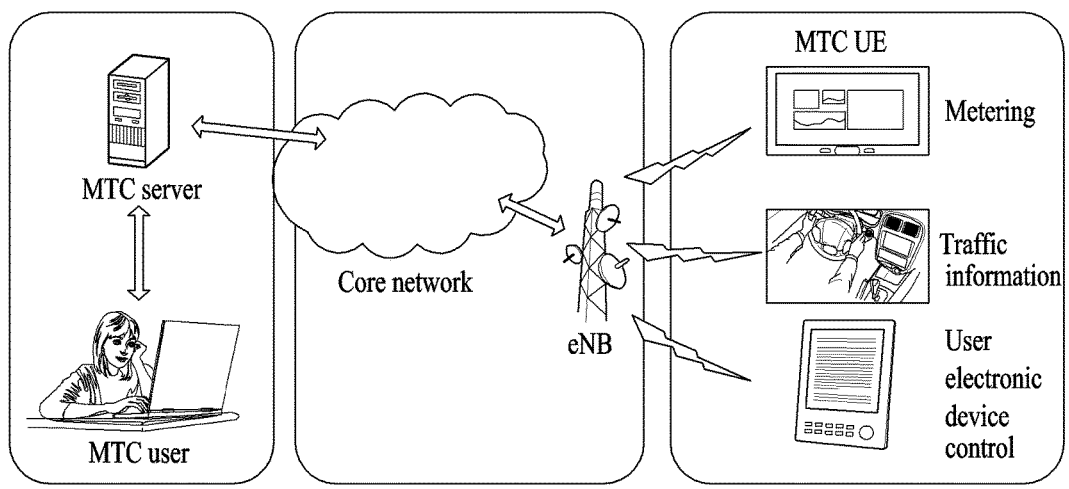
FIG. 13 illustrates an exemplary structure of machine type communication (MTC).

FIG. 13 illustrates an exemplary structure of machine type communication (MTC). MTC may refer to communication performed between machines without human intervention, and a UE used in MTC may be referred to as an MTC device. The MTC UE may have characteristics such as low mobility, time tolerant or delay tolerant, small data transmission, etc. Due to the characteristic of the MTC UE, MTC may be used for communication between machines without human intervention. For example, the MTC UE may be used to provide a service such as tracking, metering, payment, medical service, remote control, etc. In addition, MTC may be referred to as machine to machine (M2M).

Referring to FIG. 13, the MTC UE may communicate with another MTC UE or an MTC server through a mobile communication network. The MTC server may receive a service such as metering, road information, water level measurement, use of a surveillance camera, stock report of a vending machine, user electronic device adjustment, etc. and provide the service to a user.

A next system of LTE-A has considered to configure inexpensive/low specification UE that mainly performs data communication such as meter checking, water level measurement, use of a surveillance camera, stock report of a vending machine, etc. As described above, the UE may be collectively referred to as a MTC UE (hereinafter, referred to as 'MTC') for convenience. In the case of MTC, the amount of instantaneous transmission data is low, whereas the number of operating UEs belonging to one cell may be high. Accordingly, if a control channel (e.g., DL/UL grant PDCCH) for uplink/downlink scheduling is transmitted whenever each MTC performs uplink/downlink data transmission, a high burden to an eNB is resulted in terms of overhead.

Accordingly, a method of grouping a plurality of MTC UEs and performing uplink/downlink scheduling in units of the MTC groups to reduce a control channel overhead burden may be considered. In detail, a plurality of MTC UEs may be grouped to configure/set an MTC group, and scheduling related information such as resource allocation (RA) information, modulation and coding scheme (MCS) information, and/or transport block (TB) size information may be preset through higher layer signaling (e.g., RRC signaling) for each MTC. Then, a method of triggering data scheduling using the preset scheduling related information for each MTC (e.g., RA/MCS/TB information) by transmitting/receiving one common PDCCH in units of MTC groups at a time point when data scheduling is actually required may be considered. For convenience of description, this method is referred to as a common PDCCH trigger method. For example, one common PDCCH in an MTC group unit may have a similar format to DL/UL grant DCI format for general UE-specific scheduling, DCI format 3/3A for simultaneous UL power control for a plurality of UEs, or the like. In the case of the common PDCCH trigger method, a corresponding MTC UE may perform individual UL/DL data transmission and receipt according to the scheduling related information (e.g., RA/MCS/TB information) set for MTC in a corresponding MTC group.

When the common PDCCH trigger method is applied, data scheduling (or data transmission and receipt) may not be always required at once with respect to all MTCs in a MTC group. Accordingly, one common PDCCH for triggering MTC group scheduling needs to involve indicating a MTC UE as an actual data scheduling target in the corresponding MTC group. Accordingly, when MTCs belonging to an MTC group have approximately similar traffic characteristics and transmission cycle (e.g., when simultaneous data scheduling is easy/possible), the common PDCCH trigger method may be effective, but otherwise (e.g., when the number of MTCs as an actual data scheduling target in an MTC group is comparatively low), the common PDCCH trigger method may be ineffective in terms of overhead.

Accordingly, the present invention proposes a method of triggering data scheduling using scheduling related information (e.g., pre-allocated/set RA/MCS/TB information) by pre-allocating/presetting a specific PHICH resource (and information associated with PHICH transmission) as well as the scheduling related information such as resource allocation information, modulation and coding scheme information, and/or transfer block size information for each MTC through higher layer signaling (e.g., RRC signaling) and then transmitting/receiving a specific PHICH through a PHICH resource preset for each MTC at a time point when data scheduling is actually required. The proposed method is referred to as a PHICH trigger method for convenience, and a PHICH for scheduling trigger according to the PHICH trigger method is referred to as a "T-PHICH" for convenience. According to the PHICH trigger method, a corresponding MTC UE may perform UL/DL data transmission and receipt based on preset information (e.g., scheduling related information such as RA/MCS/TB information) according to the decoding result of T-PHICH received through a preset PHICH resource. For example, when the PHICH decoding result is "ACK", data scheduling may be indicated/recognized to be triggered. As another example, when the PHICH decoding result is "NACK", data scheduling may be indicated/recognized not to be triggered.

As described above, in the case of a PHICH, code division multiplexing (CDM) may also be basically applied while using a lower number of resource elements (REs) than a PDCCH. Accordingly, the PHICH trigger method may be advantageously and effectively reduce control channel overhead involved in scheduling. The proposed method is not limited only to communication between an MTC UE and an eNB. For example, the proposed method (PHICH trigger method) may be applied to all of communication between a general UE and an eNB, communication between a general UE and a relay, and communication between an MTC UE and a relay.

Figure 14:
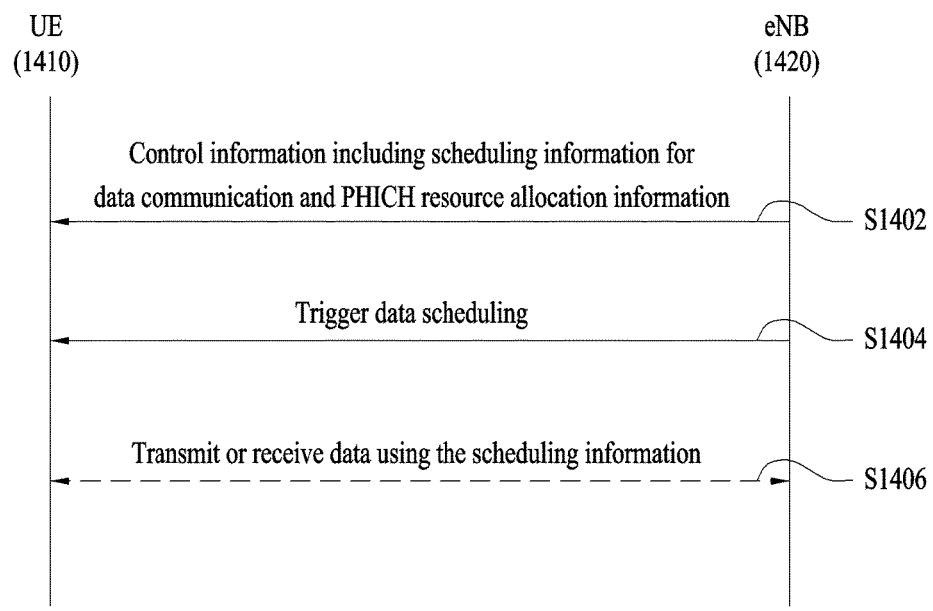
FIG. 14 illustrates an example of a PHICH trigger method according to the present invention.

FIG. 14 illustrates an example of a PHICH trigger method according to the present invention.

Referring to FIG. 14, a UE 1410 may receive control information for data transmission and receipt from an eNB 1420 (S1402). In this case, the control information may further include resource allocation information used to receive or monitor a T-PHICH. In addition, the control information may be received through higher layer signaling (e.g., RRC signaling).

Then the UE 1410 may receive a trigger signal for triggering data scheduling using the scheduling (S1404). In this case, the trigger signal may be received through the T-PHICH. For example, the data scheduling may include uplink scheduling for uplink data transmission and/or downlink scheduling for downlink data transmission. For example, one common T-PHICH resource may be allocated for each DL/UL scheduling or independent T-PHICH resources may be allocation to the respective DL/UL scheduling. For example, in the former case, in response to "ACK" being received through the T-PHICH, it may be considered that DL/UL scheduling is simultaneously triggered.

For example, one T-PHICH resource may include one or more PHICH resources/indexes. A plurality of PHICH resources/indexes constituting one T-PHICH resource may be frequency division multiplexed (FDM)/code division multiplexed (CDM) in the same subframe or may be time division multiplexed across a plurality of subframes. In this case, the UE may perform combined decoding or ACK/NACK bundling on the PHICH resources/indexes to check whether T-PHICH-based data scheduling is present.

For example, information associated with T-PHICH transmission (or resource allocation information for T-PHICH receipt) may include a T-PHICH resource index. In this case, the T-PHICH resource index may be represented as a PHICH resource index pair (refer to Equation 1 above). In addition, the information associated with T-PHICH (or resource allocation information for T-PHICH receipt) may include monitoring cycle/offset for corresponding T-PHICH transmission. For example, the information associated with T-PHICH (or resource allocation information for T-PHICH receipt) may include information about a subframe for performing T-PHICH detection/receipt in order to check whether data scheduling based on preset/pre-allocated scheduling information (e.g., RA/MCS/TB information) is triggered. Accordingly, a subframe in which there is no T-PHICH transmission may be present, and a UE may omit a monitoring operation for T-PHICH in the subframe in which there is no T-PHICH transmission.

For example, upon receiving a trigger signal for triggering data scheduling, the UE 1410 may transmit and receive data using pre-allocated scheduling information (S1406). For example, when downlink scheduling is triggered, the UE

1410 may receive downlink data from the eNB 1420 according to the pre-allocated scheduling information. For example, when uplink scheduling is triggered, the UE 1410 may transmit uplink data to the eNB 1420 according to the pre-allocated scheduling information. In addition, it may be possible to simultaneously trigger both uplink scheduling and downlink scheduling, and in this case, uplink scheduling and downlink scheduling may be performed using a predetermined method (e.g., TDM).

As described above, a resource (hereinafter, a HARQ-ACK resource) for uplink ACK/NACK transmission for DL data may be determined as a PUCCH resource linked to a lowest CCE index for carrying a DL grant PDCCH (refer to Equation 3). In addition, a resource (hereinafter, a PHICH resource) for downlink ACK/NACK transmission for UL data may be determined based on a lowest PRB index for PUSCH transmission (refer to Equation 1). Accordingly, according to the data scheduling method according to the present invention and other similar methods (e.g., a method of triggering actual data scheduling through L1/L2 signaling, PDCCH/PHICH, or the like while data transmission related information (e.g., RA/MCS/TB) is pre-set via higher layer signaling (e.g., RRC signaling), etc. corresponding DL grant PDCCH transmission may be omitted during DL data scheduling, and thus an HARQ-ACK resource induced from the DL grant PDCCH transmission may not be present. In addition, in the case of UL data scheduling, since UL data transmission is performed through the same PRB resource all the time, corresponding PHICH resource/index may also be fixed. Accordingly, when the data scheduling method according to the present invention and other similar methods are applied, the present invention proposes a method of allocating HARQ-ACK transmission resource (i.e., HARQ-ACK resource) for DL data receipt notification and/or PHICH resource/index for UL data receipt notification through higher layer signaling (e.g., RRC signaling). In this case, PHICH resource/index for UL data receipt notification and PHICH resource/index for T-PHICH may be independently allocated or one (or more) PHICH resource/index(s) commonly used for UL data receipt notification and T-PHICH may be allocated.

As another method of allocating HARQ-ACK transmission resource (i.e., HARQ-ACK resource) for DL data receipt notification, PHICH resource/index of DL PRB resource/index may be pre-linked with PUCCH resource/index according to a specific rule and then HARQ-ACK to corresponding DL data receipt may be transmitted using T-PHICH resource/index for triggering DL data scheduling or PUCCH resource/index linked with PRB resource/index constituting DL data transmission.

Although the example of FIG. 14 has been described in terms of a UE, the same/similar operation may be performed between a relay and a UE. In this case, in the above description, the UE may be replaced with a relay. In the example of FIG. 14, an operation corresponding to the operation of the UE may be performed by an eNB or a relay.

Thus far, although the example in which a T-PHICH according to the present invention is configured/set based on a PHICH (for receipt notification transmission for PDCCH-based UL data) has been described, the present invention is not limited only to the PHICH-based method. For example, the T-PHICH may be configured/set based on an enhanced PHICH (EPHICH) for receipt notification transmission for UL data scheduling based on enhanced PDCCH (EPDCCH)-based UL data scheduling transmitted through a PDSCH region. As another example, the T-PHICH (or a PHICH constituting the T-PHICH) according to the present invention may be replaced in the form of specific DCI (referred to as "T-DCI") transmitted based on a PDCCH or an EPDCCH. In this example, information items such as a DCI format type for the T-DCI, a DCI payload size, a DCI content configuration, a scrambling RNTI type, PDCCH/EPDCCH candidate position, and so on may be pre-determined between an eNB and a UE or may be semi-statically set via higher layer signaling (e.g., RRC signaling). All the proposed methods applied to the T-PHICH (or the PHICH constituting the T-PHICH) may also be applied to T-DCI in the same/similar way. In addition, thus far, although the example in which the T-PHICH is configured/set based on a PHICH has been described, a PHICH may be replaced with an arbitrary physical channel for carrying hybrid automatic repeat request (HARQ)-acknowledgement (ACK) response received in response to UL data transmission.

Figure 15:
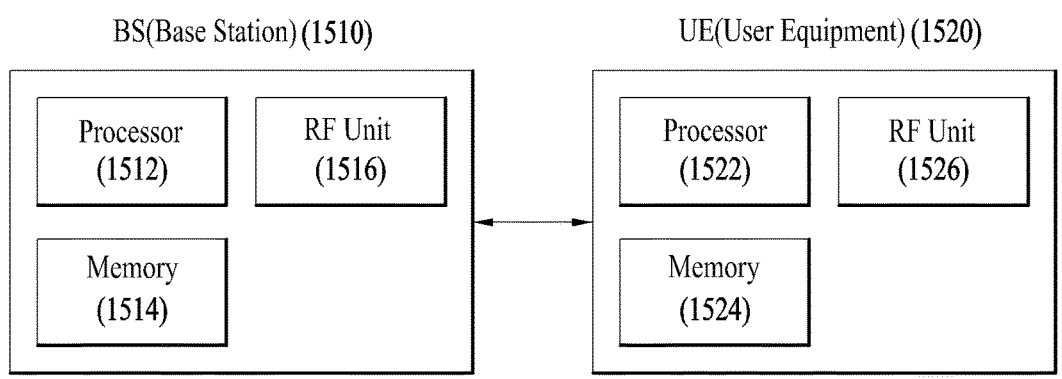
FIG. 15 is a diagram illustrating a BS 1510 and a UE 1520 to which the present invention is applicable.

FIG. 15 is a diagram illustrating a BS 1510 and a UE 1520 to which the present invention is applicable.

Referring to FIG. 15, a wireless communication system includes the BS 1510 and the UE 1520. When the wireless communication system includes a relay, the BS 1510 or the UE 1520 can be replaced with the relay.

The BS 1510 includes a processor 1512, a memory 1514, and a radio frequency (RF) unit 1516. The processor 1512 may be configured to embody the procedures and/or methods proposed by the present invention. The memory 1514 is connected to the processor 1512 and stores various pieces of information associated with an operation of the processor 1512. The RF unit 1516 is connected to the processor 1512 and transmits/receives a radio signal. The UE 1520 includes a process 1522, a memory 1524, and an RF unit 1526. The processor 1522 may be configured to embody the procedures and/or methods proposed by the present invention. The memory 1524 is connected to the processor 1522 and stores various pieces of information associated with an operation of the processor 1522. The RF unit 1526 is connected to the processor 1522 and transmits/receives a radio signal.

The embodiments of the present invention may be implemented by various means, for example, hardware, firmware, software, or a combination thereof.

In a hardware implementation, an embodiment of the present invention may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software implementation, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

A software module including instructions and/or data implementing the embodiments of the present invention may include a script, a batch, or other executable files. The software module may be stored on a machine-readable or computer-readable storage medium such as a disk drive. Storage media used for storing software modules in accordance with an embodiment of the invention may be an arbitrary type of disk including a floppy disk, an optical disk, DVD, CD-ROM, a micro drive, a magneto-optical disk, or an arbitrary ROM, RAM, EPROM, EEPROM, DRAM, VRAM, flash memory device, a magnetic or optical card, a nanosystem (including molecular memory IC), or an arbitrary type of medium suitable for storing instructions and/or data A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein.

In case that a software module implementing the embodiments of the present invention is stored in a computer-readable storage medium, the software module may be implemented as codes or instructions enabling a server or computer to execute the embodiments of the present invention when the codes or instructions are executed by a processor (e.g., microprocessor).

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point as necessary. The term "terminal" may also be replaced with a user equipment (UE), a mobile station (MS) or a mobile subscriber station (MSS) as necessary.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a wireless communication apparatus such as a user equipment (UE), a base station (BS), relay, etc.

The invention claimed is:

1. A method of performing data communication by a user equipment (UE), the method comprising:
receiving scheduling information through a radio resource control (RRC) layer signaling, the scheduling information including resource allocation (RA) information for the data communication, modulation and coding scheme (MCS) information, and transport block (TB) size information; and
receiving, based on a preset resource index, a hybrid automatic repeat request (HARQ)-acknowledgement (ACK) signal through a physical HARQ indicator channel (PHICH); and
when the PHICH is received and the HARQ-ACK signal indicates ACK, performing a physical uplink shared channel (PUSCH) transmission or a physical downlink shared channel (PDSCH) reception based on the RA information, the MCS information, and the TB size information received through the RRC layer signaling,
wherein a physical downlink control channel (PDCCH) is omitted for the PUSCH transmission and the PDSCH reception,
wherein the user equipment does not perform any operation for the PUSCH transmission and the PDSCH reception when the HARQ-ACK signal indicates negative acknowledgement (NACK),
wherein the scheduling information comprises downlink scheduling information or uplink scheduling information, and
wherein one of the PDSCH reception based on the downlink scheduling information or the PUSCH transmission based on the uplink scheduling information is performed when the preset resource index is independently allocated for the PDSCH reception and the PUSCH transmission and the HARQ-ACK signal indicates ACK.

2. The method according to claim 1, wherein the PDSCH reception based on the downlink scheduling information and the PUSCH transmission based on the uplink scheduling information are simultaneously performed when the preset resource index is commonly allocated for the PDSCH reception and the PUSCH transmission and the HARQ-ACK signal indicates ACK.

3. The method according to claim 1, wherein the preset resource index is allocated through the RRC layer signaling.

4. The method according to claim 1, wherein the preset resource index indicates at least one of information of a resource group to which the PHICH is allocated, information of an orthogonal sequence applied to the PHICH, and a cycle or offset for monitoring the PHICH.

5. The method according to claim 1, wherein a plurality of physical resources are allocated for the PHICH, and the plurality of physical resources are frequency division multiplexed (FDM) or code division multiplexed (CDM) in a same subframe or is time division multiplexed (TDM) across a plurality of subframes.

6. A user equipment (UE) for performing data communication, the UE comprising:
a radio frequency (RF) unit; and
a processor, wherein the processor is configured to:
receive scheduling information through a radio resource control (RRC) layer signaling through the RF unit, the scheduling information including resource allocation (RA) information for the data communication, modulation and coding scheme (MCS) information, and transport block (TB) size information, and receive, based on a preset resource index, a hybrid automatic repeat request (HARQ)-acknowledgement (ACK) signal through a physical HARQ indicator channel (PHICH); and when the PHICH is received and the HARQ-ACK signal indicates ACK, perform a physical uplink shared channel (PUSCH) transmission or a physical downlink shared channel (PDSCH) reception based on the RA information, the MCS information, and the TB size information received through the RRC layer signaling, wherein a physical downlink control channel (PDCCH) is omitted for the PUSCH transmission and the PDSCH reception, wherein the user equipment does not perform any operation for the PUSCH transmission and the PDSCH reception when the HARQ-ACK signal indicates negative acknowledgement (NACK), wherein the scheduling information comprises downlink scheduling information or uplink scheduling information, and wherein one of the PDSCH reception based on the downlink scheduling information or the PUSCH transmission based on the uplink scheduling information is performed when the preset resource index is independently allocated for the PDSCH reception and the PUSCH transmission and the HARQ-ACK signal indicates ACK.

7. The UE according to claim 6, wherein the PDSCH reception based on the downlink scheduling information and the PUSCH transmission based on the uplink scheduling information are simultaneously performed when the preset resource index is commonly allocated for the PDSCH reception and the PUSCH transmission and the HARQ-ACK signal indicates ACK.

8. The UE according to claim 6, wherein the preset resource index is allocated through the RRC layer signaling.

9. The UE according to claim 6, wherein the preset resource index indicates at least one of information of a resource group to which the PHICH is allocated, information of an orthogonal sequence applied to the PHICH, and a cycle or offset for monitoring the PHICH.

10. The UE according to claim 6, wherein a plurality of physical resources are allocated for the PHICH, and the plurality of physical resources are frequency division multiplexed (FDM) or code division multiplexed (CDM) in a same subframe or is time division multiplexed (TDM) across a plurality of subframes.

* * * * *